3,312,649
PAVING ASPHALT CONTAINING CHLORINATED POLYETHYLENE
Armin C. Pitchford and Homer J. Sarrett, Jr., Bartlesville, Okla., assignors to Phillips Petroleum Company, a corporation of Delaware
No Drawing. Filed Jan. 21, 1963, Ser. No. 252,595
6 Claims. (Cl. 260—28.5)

This invention relates to asphalt compositions. In one of its aspects, this invention relates to an improved paving asphalt. In another aspect, this invention relates to an asphalt having blended therein a chlorinated solid linear polyolefin.

The addition of rubber or chlorinated rubber to asphalt is known. These materials are added to the asphalt to increase the elasticity, hardness and fusion point of the asphalt, and rubber-asphalt mixtures are commercially used as paving asphalts because the improved properties are highly desirable in this use. The increase in cost incurred by the addition of rubber prevents use of these improved asphalts in many potentially desirable applications. Frequently the rubber or chlorinated rubber is first admixed with a flux oil to aid in incorporating the additive in the asphalt. The flux oil-additive generally contains 25 to 75 weight percent additive based on additive plus oil. These flux oils are generally aromatic in nature boiling in the range of heavy gas oil and lubricating oils and include such oils as those recovered by solvent extraction of lubricating oils, e.g. phenol extraction followed by propane fractionation.

We have now found a superior additive which imparts to the asphalt all of the desirable properties obtained from the use of rubber and which can be used at only a fraction of the cost of the rubber since considerably less is required to obtain substantially the same magnitude of improvement. The additive of this invention also has the advantage of being readily blended in the asphalt without the use of a flux oil.

It is an object of this invention to provide a highly effective additive in asphalt.

Another object of this invention is to provide a superior paving asphalt.

Still another object of this invention is to provide a blend of asphalt with the halogenated product resulting from halogenating a substantially linear polyethylene.

Other objects, features and advantages of this invention will be obvious to those skilled in the art having been given this disclosure.

According to this invention, a paving asphalt has blended therein 0.5 to 5 weight percent of a chlorinated solid linear polyolefin containing 15 to 35 weight percent chlorine.

It is known in the art to incorporate polyvinylchloride into asphalt as is disclosed in British Patent 602,582, May 28, 1948. However, as shown by that patent there is a general hardening of the asphalt with increasing amounts of the polyvinyl chloride. With the additive of this invention, the penetration of the blended asphalt increases while the softening point also increases, thus the resistance of the blend to temperature changes is improved. The use of chlorosulfonated polymer of ethylene and of chlorinated polymers of conventional ethylene have also been suggested, however, there does not appear to be any particular problem with such materials nor do such materials provide all of the advantages of the particular additive of this invention. We have found that the additive of this invention when added in the specified range gives to asphalt all of the desirable properties imparted by rubber or chlorinated rubber when added in the usual range, e.g. 10-20 percent.

Blending of the asphalt and halogenated polymer can be effected by any suitable means, for example, a hot roll mill, a Banbury mixer, a Baker-Perkins mixer, etc. A particularly good way to effect the dispersion of the additive in the asphalt is by use of a colloid mill, for example, a Charlotte mill. The mixing is effected at temperatures sufficiently elevated that the materials being blended are softened, for example, 150° F. to 400° F. An excellent way of operating when using a colloid mill is to charge fluid asphalt from a tank to the mill along with halogenated polymer additive and then discharge the milled dispersion back to the tank. The fluid asphalt is thus recycled through the mill and the additive concentration built up to the desired final level by addition of the additive over a period of time. It is usually desirable to continue recycling the asphalt blend through the mill for a time after the additive has been added in order to insure uniform distribution throughout the tank. No flux oil is required or desirable. However, it is within the scope of the invention to use such if desired.

The chlorinated polyethylene applicable to this invention are those resulting from chlorinating a solid substantially linear polyethylene. The ethylene polymer can be prepared by any method described in the art for making linear, high density, highly crystalline polymers of 1-olefins such as that described by Hogan and Banks in U.S. Patent 2,825,721. Polyethylene prepared by the Hogan and Banks method generally have a density of at least 0.940, a crystallinity in excess of 90 percent and a molecular weight of 35,000, e.g. 50,000 to 150,000 or even higher. However, we are not limited to such polymers, the only requirement being that the polymer be linear and have a crystallinity of at least 80 percent as determined by magnetic nuclear resonance at room temperature.

The chlorinated polyethylene will generally contain 15 to 35 percent, ordinarily 15 to 28 percent chlorine and preferably 20 to 25 percent chlorine. The chlorinated polymer generally has a softening point lower than the polyethylene from which it was made. These materials are generally rubbery in nature. As has been indicated, the amount of polymer employed is in the range 0.5 to 5 weight percent, preferably 1 to 3 weight percent, based on the weight of the total blend. Although amounts of chlorinated polyethylene in excess of 5 weight percent would be operable in finished paving, the viscosity of the blends becomes too great to handle in ordinary paving machinery, indeed about 3 percent is the usual maximum.

The asphalts used in making these blends are those paving asphalts well known to the art. These asphalts generally have a ring and ball softening point from 100° F. to 140° F., and 77° F. penetration from 40 to 300. Asphalts with softening points and penetrations outside this range, however, can be improved by the additive and method of the present invention.

Chlorination of the ethylene polymers can be effected by any known method. One process involves forming a solution of the polyethylene in carbon tetrachloride at an elevated temperature and under superatmospheric pressure. When products having chlorine contents in excess of 15 weight percent are prepared, the last stages of the chlorination can be carried out at atmospheric pressure. Additional solvent is added as needed. Another method comprises starting the chlorination in the presence of a solvent such as tetrachloroethane and completing the reaction in the presence of a relatively low boiling solvent such as carbon tetrachloride.

The chlorinated polymers are rubbery materials having a softening point generally lower than the parent polyethylene. Polyethylene prepared according to the described procedure and having a molecular weight of about 50,000 will have a softening point of the order of 260° F. and polyethylene having a molecular weight in the range of 15,000 to 20,000 will have a softening point of the order of 248° F.

In the specific examples which follow, the tests of penetration, ring and ball softening point, viscosity and ductility are all standard tests and well known in the asphalt art. The test for elasticity is termed "Recovery" in the tables, and this measurement is made at the end of the ductility test. In the ductility test, an asphalt sample is stretched under controlled conditions until it breaks or reaches the limit of the test apparatus. The "Recovery" test result is the amount of shrinkage of the test specimen in one hour following the ductility test, the figure being expressed as percent of the extension in the ductility test. The recovery test is designed to test the ability of paving asphalt to recover from distortion effected during use.

*Example I*

Ethylene was polymerized over a chromium oxide-silica-alumina catalyst containing 2.4 weight percent chromium as chromium oxide (including hexavalent chromium) at 320° F. and a pressure of 400 p.s.i.g., a space velocity (volumes liquid/volume reactor/hour) of 6, and a feed containing 2.0 weight percent ethylene in isooctane (2,2,4-trimethylpentane). The ethylene feed rate was 1.3 pounds/hour and the isooctane flow was 11 gallons/hour. The polyethylene obtained was insoluble in benzene and acetone, had a density of 0.951, a softening point of 248° F. (method of Karrer, Davis, and Dieterich, Ind. Eng. Chem. Anal. Ed., 2, 96–99 (1930)), a tensile strength of 2000–2100 p.s.i., an inherent viscosity of 0.615, and a molecular weight of 15,040. It was substantially insoluble in carbon tetrachloride under reflux conditions at atmospheric pressure.

The ethylene polymer was dissolved at a rate of 400 grams of polymer per 3 liters of tetrachlorethane and chlorine was then bubbled through the solution at atmospheric pressure, at a temperature of 212 to 230° F. and in the presence of ultraviolet light. The resulting chlorinated polyethylene contained 26 weight percent chlorine.

The chlorinated ethylene was admixed with an asphalt in a Charlotte colloid mill to produce dispersions with various additive loadings. The asphalt used had a ring and ball softening point of 117° F., penetration (77° F.) of 72, viscosity at 300° F. of 120 SFS, ductility of 1604 and recovery of zero. Time and temperature as well as other data are shown in Table I. Milling was discontinued when the properties appeared to be leveling out and further milling was unnecessary.

seen that the newly-acquired elastic properties are retained and the softening point is raised without unduly large effect on the 77° F. penetration characteristics. It is therefore evident that properties of the asphalt blend can be varied to obtain improved values of some properties without sacrificing others.

*Example II*

A two-step mixing procedure was devised in which the more difficult initial dispersion of additive in asphalt was effected in a relatively small volume batch, and the final mixing had relatively low power requirements. In the first step, a concentrate of chlorinated polyethylene (same batch as described in Example I) was prepared by heating the chlorinated polyethylene with an aromatic flux oil, mixing to distribute the oil throughout the additive material and allowing the mixture to stand in an oven at about 325° F. for an hour to allow the oil to soak the chlorinated polyethylene. The mixture was then heated to a higher temperature about 375° F. on a hotplate and kneaded (e.g., with a spatula) to form a homogeneous mixture. When cooled, this concentrate was rubbery and appeared homogeneous.

The final blend was prepared by heating asphalt and additive concentrate in the desired amount to form a fluid mixture and mixed to produce a homogeneous mixture (e.g., with a laboratory propellor mixer).

The oils used in the examples were the aromatic extract oils from phenol extraction of a heavy lubricating oil (approximately 200 SUS at 210° F.) and the more aromatic portion of this extract oil produced by propane fractionation.

The table below shows data on composition and properties of flux oil-chlorinated polyethylene blends. These blends were all homogeneous and resemble unvulcanized rubber in being quite tough and elastic.

TABLE II.—COMPOSITION AND PROPERTIES OF CHLORINATED POLYETHYLENE CONCENTRATES

| | Plasticizer | | |
| --- | --- | --- | --- |
| | 250 extract $C_3$ bottoms | 250 extract | 250 extract |
| Blend No. | A | B | C |
| Percent Chlorinated Polymer | 40 | 50 | 75 |
| Maximum Mixing Temperature | 350 | 325 | 325 |
| Softening Point, R and B, F | 299 | 313 | |

TABLE I.—PROPERTIES OF BLENDS PRODUCED IN A COLLOID MILL

| | 0.5% Cl Polyethylene Milling Time, Minutes | | | | | | 1.0% Cl Polyethylene Milling Time, Minutes | | | | | | | 2.0% Cl Polyethylene Milling Time, Minutes | | | | | | | 3.0% Cl Polyethylene Milling Time, Minutes | | | | | | |
| --- | --- | --- | --- | --- | --- | --- | --- | --- | --- | --- | --- | --- | --- | --- | --- | --- | --- | --- | --- | --- | --- | --- | --- | --- | --- | --- | --- |
| | 5 | 10 | 15 | 20 | 30 | 40 | 5 | 10 | 15 | 20 | 30 | 40 | 60 | 5 | 10 | 15 | 20 | 30 | 40 | 60 | 5 | 10 | 15 | 20 | 30 | 40 | 60 |
| Milling Temperature, °F | 314 | 320 | 323 | 325 | 325 | 325 | 298 | 320 | 320 | 321 | 325 | 325 | 326 | 315 | 320 | 325 | 325 | 326 | 328 | 331 | 306 | 320 | 330 | 340 | 350 | 355 | 355 |
| Penetration at 77° F., 100 g./5 sec | 89 | 89 | 91 | 89 | 84 | 80 | 120 | 107 | 96 | 140 | 118 | 122 | 95 | 95 | 80 | 75 | 74 | 80 | 65 | 76 | 60 | 63 | 69 | 75 | 85 | 59 | 69 |
| Softening Point, °F., R & B | 113 | 112 | 111 | 112 | 114 | 114 | 110 | 112 | 112 | 107 | 110 | 111 | 119 | 124 | 129 | 130 | 136 | 138 | 137 | 135 | 141 | 131 | 134 | 144 | 153 | 155 | 155 |
| Viscosity at 300, S.S.F. | 125 | 126 | 130 | 139 | 140 | 140 | 118 | 121 | 122 | 128 | 129 | 135 | 145 | 175 | 191 | 212 | 236 | 253 | 253 | 254 | 237 | 287 | 392 | 317 | 385 | 404 | 416 |
| Ductility | | | | 160+ | 160+ | 160+ | | | | 160+ | 160+ | 160+ | 160+ | | | 160+ | 160+ | | | 152 | 138 | | | 38 | | 66 | 82 |
| Recovery, % | | 63 | | 64 | | 64.5 | | 41 | | | | 65 | 71 | | | 66 | | | 80 | 81 | | 66 | | | 76 | | 79 |

It is evident from these data that the principal effect of small amounts (0.5 weight percent) chlorinated polyethylene is that of imparting elasticity, as evidenced by recoveries of about 64 percent, varying somewhat in the milling time. With increasing amounts of additive, it is Concentrate A was used in making modified paving asphalt blends containing small amounts of the additive. These data are shown in Table III, along with comparable data for the unmodified asphalt and the asphalt modified with five weight percent rubber.

TABLE III.—PAVING GRADE ASPHALT MODIFIED WITH CHLORINATED POLYETHYLENE OR RUBBER

|  | Control | Rubber | Blend No. | | |
|---|---|---|---|---|---|
|  |  |  | A-1 | A-2 | A-3 |
| Chlorinated Polyethylene, weight percent | 0 | 0 | 1.0 | 2.0 | 1.4 |
| Weight percent, rubber [1] | 0 | 5.0 | 0 | 0 | 0 |
| Weight percent, flux oil |  |  | 1.5 | 3.0 | 2.1 |
| 83 Pen. Paving Asphalt, weight percent | 100.0 | 95.0 | 97.0 | 95.0 | 97.5 |
| Viscosity, SROS, 275 F | 19.8 | 71.4 |  |  | 42.5 |
| Penetration, 200/60/32 F | 16 | 23 |  |  | 14 |
| Penetration, 100/5/77 F | 82 | 76 | 71 | 59 | 70 |
| Penetration, 50/5/115 F | 450 | 330 |  |  | 376 |
| Softening Point, R & B, F | 116 | 129 | 126 | 138 | 126 |
| Ductility, 77 F, cm | 160+ | 160+ | 160+ | 62 | 160+ |
| Recovery, percent | Nil | 41.9 | 81 | 86 | 79 |
| Ductility, 39.2 F., cm | 4.5 | 160+ |  |  | 7.5 |
| Temp. Sus. Factor | 5.28 | 4.04 |  |  | 5.17 |
| Penetration Index | −0.8 | +0.7 | +0.3 | +1.2 | +0.4 |

[1] 31 Mooney viscosity (ML-4) Philprene.

400° F. was unsuccessful, with only a small amount of the polymer dispersing in the asphalt; an equilibrium apparently limited the dispersion obtainable.

Using flux oil to make a polyethylene concentrate and dispersing this in the asphalt produced dispersions which appeared homogeneous at elevated temperatures (250° F. to 300° F.). These blends became granular, and small grains of polymer could be detected when the surface was distorted. The non-homogeneous nature of the blends caused marked lowering of the ductility and the blends had no compensating beneficiated properties. The blends could not be considered to show any improvement over the original asphalt.

*Example IV*

Several runs were made where a polyethylene such as that prepared by the method of Example I was chlorinated to various chlorine contents and then variable amounts of the chlorinated polymer were blended with asphalt and evaluated. The data are given in Table IV.

TABLE IV.—DATA ON CHLORINATED-POLYETHYLENE ASPHALT BLENDS

| Percent Cl in Polymer |  | 13.1 | | | | 19.8 | | | | 22.7 | | | 24.9 |
|---|---|---|---|---|---|---|---|---|---|---|---|---|---|
| Percent Polymer in Asph | 0.0 | 0.5 | 1.0 | 2.0 | 3.0 | 0.5 | 1.0 | 2.0 | 3.0 | 0.5 | 1.0 | 2.0 | 3.0 | 1.0 |
|  | Control | | | | | | | | | | | | | |
| Soft. Point, F | 118 | 113 | 122 | 174 | 202 | 117 | 125 | 168 | 174 | 118 | 125 | 149 | 156 | 125 |
| Pen., 77 F | 95 | 85 | 78 | 65 | 58 | 98 | 84 | 70 | 56 | 97 | 99 | 97 | 80 | 88 |
| Pen., 39.2 F | 31 | 23 | 22 | 20 | 20 | 34 | 30 | 31 | 30 | 28 | 30 | 30 | 25 | 29 |
| Ductility, 77 F., cm | 160+ | 128 | 70 | 53 | 18 | 160+ | 160+ | 62 | 41 | 160+ | 160+ | 160+ | 78 | 160+ |
| Recovery, 77 F., percent |  | 53.8 | 48.6 | 35 | 58 | 45.7 | 53.2 | 80.5 | 73 | 69 | 63.7 | 57 | 80.8 | 70 |
| Ductility, 39.2 F., cm | 18 |  | 0 | 0 | 0 | 10 | 0 | 13 | 0 | 0 | 10 | 18 | 16 | 10.5 |
| Recovery, 39.2 F., percent |  |  | 0 | 0 | 0 | 35 |  | 38.5 |  |  | 35 | 55.5 | 50 |  |
| Viscosity, 275 F., SFS |  |  |  |  |  |  |  |  |  |  |  |  |  |  |
| Solubility, CCl₄, percent |  |  |  |  | 99.06 |  |  | 99.8 | 99.7 | 99.84 | 99.82 | 99.81 |  |  |
| Pen., Ratio: Pen. 39.2F×100/Pen. 77 F | 32.6 | 27.1 | 28.2 | 30.8 | 34.5 | 34.7 | 35.7 | 44.3 | 53.6 | 28.9 | 30.3 | 31.0 | 31.3 | 33.0 |
| Pen. Index [1] | 0 | −1 | 0 | +5 | +6.5 | 0 | +1 | +4.5 | +4.5 | −1 | +1.5 | +4.0 | +4 | +1 |

| Percent Cl in Polymer | 30.0 | | | | 45.0 | | | | 65.0 | | | |
|---|---|---|---|---|---|---|---|---|---|---|---|---|
| Percent Polymer in Asph | 0.5 | 1.0 | 2.0 | 3.0 | 0.5 | 1.0 | 2.0 | 3.0 | 0.5 | 1.0 | 2.0 | 3.0 |
| Soft. Point, F | 114 | 118 | 122 | 122 | 116 | 120 | 124 | 127 | 116 | 128 | 122 | 122 |
| Pen., 77 F | 108 | 96 | 81 | 81 | 94 | 86 | 72 | 64 | 100 | 65 | 48 | 49 |
| Pen., 39.2 F | 27 | 26 | 25 | 24 | 29 | 28 | 25 | 22 | 24 | 23 | 17 | 23 |
| Ductility, 77 F., cm | 160+ | 160+ | 108 | 160+ | 160+ | 120 | 40 | 13 | 62 | 35 | 11 | 18 |
| Recovery, 77 F., percent | 50.5 | 46.3 | 64 | 55 | 55 | 57.5 | 38 | 27 |  |  |  |  |
| Ductility, 39.2 F., cm | 9 | 10 | 12 | 12 | 10.5 | 9.5 | 5.5 | 4.5 | 7.5 | 0 | 0 | 0 |
| Recovery, 39.2 F., percent | 22.5 | 35 | 41.6 | 33 | 10 | 10.5 |  |  | 13.3 | 0 | 0 | 0 |
| Viscosity, 275 F., SFS |  |  |  |  |  |  |  |  |  |  |  |  |
| Solubility, CCl₄, percent | 99.87 | 99.85 | 99.84 |  |  |  |  | 97.95 |  |  |  | 97.65 |
| Pen., Ratio: Pen. 39.2F×100/Pen., 77 F | 25.0 | 27.1 | 30.9 | 29.7 | 30.9 | 32.6 | 34.7 | 34.4 | 24 | 35.4 | 35.4 | 32.4 |
| Pen. Index [1] | 0 | 0 | 0 | 0 | 0 | 0 | 0 | 0 | 0 | 0 | −1.2 | −1.2 |

[1] Determined by the method of Pfeiffer "The Properties of Asphalt Bitumen," Elsevier Publishing Co., 1950, pp. 166–170.

These data show that the additive of the present invention greatly improves the asphalt properties; and with the exception of low temperature ductility, the modification of properties with 1.4 weight percent chlorinated polyethylene polymer is about the same as with 5.0 weight percent rubber. Recovery is considerably better in the case of chlorinated polyethylene than with the rubber additive.

*Example III*

Attempts were made to produce homogeneous asphalt-polyethylene blends to determine the effect of the polyethylene on the asphalt properties. A polyethylene of the type chlorinated in Examples I and II and an 82 penetration (77° F.) asphalt were used.

Direct mixing of these two materials with agitation at

From the table, it can be seen that when the chlorine content was less than about 15 percent or more than about 28 percent and the amount of polymer was less than about 1 percent, the penetration index was 0 or negative. Those skilled in the art know that a positive penetration index is desirable for paving asphalts.

In the foregoing specification, the following properties are determined as follows:

*Inherent viscosity.*—A 0.1000 gram sample of polymer is dissolved in 50 ml. of Tetralin at room temperature. The viscosity of the solution at 130°±0.2° C. is then determined by means of an Ostwald-Fenske Viscosimeter (size 50, 0.8–3.0 centistokes). The viscosity of Tetralin is also determined under these conditions and the relative viscosity, $V_r$, of the polymer solution to the solvent is calculated. Molecular weight is then calculated by means of the formula:

$$MW = \frac{K(Z-303) \log V_r}{C}$$

where M.W. is molecular weight, K is $2.445 \times 10^4$, $V_r$ is the relative viscosity (as above), and C is 0.183 gram per 100 ml. (The difference between the original concentration of 0.100 gm./50 ml. and 0.183 gm./100 ml. is due to the expansion of the Tetralin between room temperature and 130° C.) This method is essentially the same as reported by Kemp and Peters, Ind. & Eng. Chem. 35, 1108 (1943).

Density is determined in the following manner: a 1/16" thick slab is compression molded by heating the polymer between suitable press plateaus, maintaining it at 325° F. for 5 minutes, and then pressing the polymer at 20,000 p.s.i. Cooling water is then circulated through the plateaus so as to provide a cooling rate from 20 to 50° F. per minute. A small "pea-sized" specimen is then cut from this sample. The density of this specimen is then determined by the height at which it floats in an ethyl alcohol-water gradient column whose density at all levels is known. The density is then reported as the value corrected to 23° C.

The crystallinity values are based upon measurement of nuclear magnetic resonance at approximately 75° F. as described by Matthews, Peiser and Richards, Acta. Cryst., 2, 85 (1949). The procedure which is followed to prepare the sample for test and to insure a close approach to equilibrium is to (1) heat the polymer to a temperature about 50° C. above the crystalline melting points, (2) maintain the polymer at this temperature for approximately one hour, and (3) cool the polymer to room temperature at a rate characterized by a fall of 1.50° C. per minute at 135° C. This entire procedure is carried out in an environment essentially free of oxygen, e.g. nitrogen.

Crystalline melting point is that temperature wherein all crystallinity disappears when slowly heating a sample, e.g. as would be determined by a polarizing microscope.

Crystalline freeze point is the first plateau on the time temperature curve which is reached when a sample of molten polymer is being allowed to cool slowly, e.g. as is plotted by automatically recording the temperature by means of a thermocouple.

We claim:

1. A composition of matter comprising a paving asphalt having a ring and ball softening point in the range 100° F. to 140° F. and a 77° F. penetration in the range 40 to 300, along with 1 to 5 weight percent, based on asphalt plus polymer, of a chlorinated solid linear polymer of ethylene, said chlorinated polymer containing 15 to 28 weight percent chlorine.

2. The composition of claim 1 wherein the chlorinated polymer has a chlorine content in the range 20 to 25 weight percent.

3. The composition of claim 2 wherein the chlorinated polymer is present in the range 1 to 3 weight percent.

4. The composition of claim 3 wherein the polyethylene prior to chlorination had a density in the range 0.95 to 0.97, a crystallinity at room temperature of at least 90 percent and a molecular weight of at least 35,000.

5. Asphalt containing dispersed therein from 0.5 to 5.0% by weight of said asphalt of a normally solid polyethylene, said polyethylene being chlorinated to the extent of from about 15 to 35% by weight thereof.

6. A process for preparing asphalt road-making compositions in which process from 0.5 to 5.0% by weight of said asphalt of a normally solid polyethylene, said polyethylene being chlorinated to the extent of 15 to 35% by weight thereof, is dispersed in said asphalt.

References Cited by the Examiner

UNITED STATES PATENTS 3,050,483   8/1962   Kalil.

MORRIS LIEBMAN, *Primary Examiner.*

D. C. KOLASCH, A. LIEBERMAN, *Assistant Examiners.*